A mesomorphic material contains at least one compound "A" ensuring a positive dielectric anisotropy of the material and a compound "B" ensuring a lowered value of optical anisotropy of the material; the content of compound A is within the range of from 4.9 to 30.0% by weight, the content of compound B is within the range of from 70 to 95.1% by weight. The material of the invention has a dielectric anisotropy of from +1 to +10 and the value of optical anisotropy—within the range of from 0.04 to 0.1.

United States Patent [19]
Grebenkin et al.

[11] Patent Number: 4,490,277
[45] Date of Patent: Dec. 25, 1984

[54] MESOMORPHIC MATERIAL WITH LOW OPTICAL ANISOTROPY AND PROCESS FOR PRODUCING SAME

[76] Inventors: Mikhail F. Grebenkin, Linia Oktyaprskoi zheleznoi dorogi, 10, kv. 79, Moscow; Alexandr V. Ivashenko, ulitsa Pervomaiskaya, 44a, kv. 57, Dolgoprudny Moskovskoi oblasti; Ljudmila A. Karamysheva, ulitsa Poltavskaya, 2, kv. 126; Lev M. Blinov, ulitsa Dubninskaya, 2, korpus 5, kv. 79, both of Moscow; Evgeny I. Kovshev, ulitsa Kirova, 12, kv. 15, Khimki Moskovskoi oblasti; Nikolai M. Shtykov, Likhachevskoe shosse, 11, kv. 45, Dolgoprudny Moskovskoi oblasti; Viktor V. Titov, ulitsa Festivalnaya, 12, kv. 95, Moscow; Vadim M. Shoshin, ulitsa Polevaya, 7, kv. 69, Moscow; Irina F. Agafonova, Dmitrovskoe shosse, 105, korpus 2, kv. 39, Moscow; Mikhail I. Barnik, Likhachevskoe shosse, 20, kv. 212, Dolgoprudny Moskovskoi oblasti, all of U.S.S.R.

[21] Appl. No.: 269,024

[22] Filed: May 29, 1981

[51] Int. Cl.$^3$ ............................ C09K 3/34; G02F 1/13
[52] U.S. Cl. ............................ 252/299.6; 252/299.62; 252/299.63; 252/299.64; 252/299.67; 350/350 R
[58] Field of Search ............ 252/299.6, 299.63, 299.67, 252/299.62, 299.64; 350/350 R

[56] References Cited

U.S. PATENT DOCUMENTS

| | | | |
|---|---|---|---|
| 3,927,066 | 12/1975 | Scherrer et al. | 252/299.6 |
| 4,058,475 | 11/1977 | Jinmai et al. | 252/299.6 |
| 4,098,301 | 7/1978 | Bloom et al. | 252/299.01 |
| 4,138,359 | 2/1979 | Mizukuchi | 252/299.65 |
| 4,198,312 | 4/1980 | Sato et al. | 252/299.63 |

FOREIGN PATENT DOCUMENTS

| | | | |
|---|---|---|---|
| 19665 | 12/1980 | European Pat. Off. | 252/299.63 |
| 2233680 | 1/1974 | Fed. Rep. of Germany | 252/299.01 |
| 2463798 | 4/1981 | France | 252/299.67 |
| 2484435 | 12/1981 | France | 252/299.63 |
| 54-151951 | 11/1979 | Japan | 252/299.63 |
| 56-74170 | 6/1981 | Japan | 252/299.67 |
| 56-67388 | 6/1981 | Japan | 252/299.67 |
| WO81/00853 | 4/1981 | PCT Int'l Appl. | 252/299.63 |

OTHER PUBLICATIONS

Blihov, L. M., "Liquid Crystals: Physical Properties and Their Possibilities in Application", Advances in Liquid Crystal Research and Applications, Bata, L., Pergamon Press, Oxford (1980), pp. 1083–1101, 1099.
Schubert, H., et al., Z. Chem., vol. 12 (6), pp. 219–220 (1972).
Demus, D., et al., Mol. Cryst. Liq. Cryst., vol. 63, pp. 129–144 (Jan. 1981).
Karamysheva, L. A., et al., Mol. Cryst. Liq. Cryst., vol. 37, pp. 29–34 (1976).
German Article entitled "Liquid Crystals in Tables", Demus, Demus and Zaschke, date unknown, p. 34.

*Primary Examiner*—Teddy S. Gron
*Attorney, Agent, or Firm*—Fleit, Jacobson, Cohn & Price

[57] ABSTRACT

A mesomorphic material contains at least one compound "A" ensuring a positive dielectric anisotropy of the material and a compound "B" ensuring a lowered value of optical anisotropy of the material; the content of compound A is within the range of from 4.9 to 30.0% by weight, the content of compound B is within the range of from 70 to 95.1% by weight. The material of the invention has a dielectric anisotropy of from +1 to +10 and the value of optical anisotropy—within the range of from 0.04 to 0.1.

1 Claim, No Drawings

MESOMORPHIC MATERIAL WITH LOW OPTICAL ANISOTROPY AND PROCESS FOR PRODUCING SAME

FIELD OF THE INVENTION

The present invention relates to liquid crystals and, more particularly, to mesomorphic materials with a positive dielectric anisotropy and a low value of optical anisotropy.

BACKGROUND OF THE INVENTION

Known in the art are mesomorphic materials with a positive dielectric anisotropy /$\Delta\epsilon$/ among which most advantageous are considered the materials consisting of substituted p-cyanobiphenyls or mixtures of substituted p-cyanobiphenyls with p-cyanoterphenyl (cf. French Pat. No. 2,207,758 Int. Cl. C 09 K 3/34, published June 21, 1974). A number of such materials are produced by a British company BDH under trade names E3, E8, etc. These materials have a wide temperature range of existence of nematic mesophase and an average value of a positive dielectric anisotropy. Thus, the material E8 passes into the nematic state at the temperature ($T_{C-N}$) = −12° C., and into the isotropic state—at the temperature ($T_{N-I}$) = 70.5° C.; $\Delta\epsilon$ of the material is equal to +13. However, these known mesomorphic materials have an insufficiently low value of an optical anisotropy /$\Delta n$/ which amounts, in their case, to about 0.2.

In order to lower the value $\Delta n$ of the materials, it has been suggested to make use of partly hydrogenated cyanobiphenyls and terphenyls, respectively derivatives of phenyltranscyclohexane and biphenyltranscyclohexane (Angew.Chemie; Bd.89, Nr. 2, published January 1977. Verlag Chemie GMBH Weinheim/Borgstr; R. Eidenschink, D. Erdmann, J. Krause, L. Pohl "Substituierte Phenylcyclohexaneline neue Klasse flüssigkristalliner Verbindungen).

Each of the above-mentioned compounds simultaneously possesses a positive dielectric anisotropy and a lowered value of optical anisotropy. Thus, a FRG company Merk produces a material consisting of the above-indicated compounds available under the trademark Nematic Phase 1132 TNC which has the following characteristics: $T_{K-N}$ = −6°, $T_{N-I}$ = 70° C.; $\Delta\epsilon$ = +10.3; $\Delta n$ = +0.14.

This material also features an insufficiently low value of $\Delta n$ so that variation of the value of $\Delta n$ vs. composition is substantially impossible. This material is produced by intermixing the components, each imparting both properties to the material: dielectric anisotropy and optical anisotropy. The resulting mixture is heated under stirring till the mixture is converted into an isotropic liquid, whereafter it is cooled to room temperature.

DISCLOSURE OF THE INVENTION

It is the object of the present invention to provide a mesomorphic material which would have a lowered value of optical anisotropy.

This object is accomplished by a mesomorphic material which, according to the present invention contains at least one compound (A) ensuring a positive dielectric anisotropy of the material and a compound (B) ensuring a lowered optical anisotropy of the material; the content of compound (A) being varied from 4.9 to 30.0%, that of compound (B)—from 70.0 to 95.1% by weight.

As compound B the mesomorphic material according to the present invention contains 4-n-alkyltranscyclohexanecarboxylic acids, for example 4-n-hexyltranscyclohexanecarboxylic acid and 4-n-butyltranscyclohexanecarboxylic acid.

Owing to the present invention, the mesomorphic material has a lower value of optical anisotropy ($\Delta n$ = 0.04 to 0.10), thus making it possible to improve performances of devices operating on liquid crystals and simplify the procedure of their manufacture. Thus, lowering $\Delta n$ value makes it possible to increase the angle of view of liquid-crystal "twist" effect indicators operating under multiplexing conditions. In polychromic projection indicators a lowered value of $\Delta n$ makes it possible to increase thickness of the mesomorphic layer to processably acceptable values and soften the requirements as to the uniformity of this thickness over the indicator surface area. This enables the formation of pure uniform colours and simplifies the indicator control.

The use of two components A and B, each separately imparting a specific property to the mesomorphic material, namely: compound A ensures a positive $\Delta\epsilon$ compound B ensures a lowered $\Delta n$ value, provides an opportunity for the production of a material with a desired low value of $\Delta n$. At the same time, the prior art materials containing agents having a particular combination of a positive $\Delta\epsilon$ and $\Delta n$ cannot possess $\Delta n$ below 0.14 and it is impossible to vary $\Delta n$ within the range of from 0.04 to 0.14 in the case of these materials.

An embodiment of the material according to the present invention is a mesomorphic material which contains, as a compound ensuring a positive dielectric anisotropy, one or two p-cyanophenyl esters of the formula:

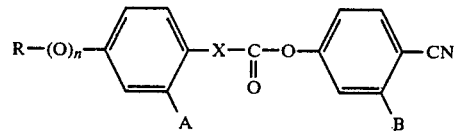

wherein
R is a $C_1$-$C_7$ n-alkyl; n is 0 and 1;
X is a simple bond or —CH=CH—;
A is hydrogen and B is Cl, or A=Cl and B=hydrogen.

The presence of these compounds makes it possible to obtain a higher value of $\Delta\epsilon$ of the material.

The compounds of the general formula (I) are novel. If the formula (I) R is a $C_4$-$C_7$ alkyl, n=1, X is a simple bond, A=Cl and B=hydrogen, these compounds are produced by alkylation of 2-chloro-4-hydroxybenzoic acid with a haloalkyl in a lower aliphatic alcohol in the presence of a caustic alkali, conversion of the resulting 2-chloro-4-alkoxybenzoic acid by means of trionyl chloride to a chloroanhydride and, treating the latter with p-hydroxybenzonitrile in pyridine at a temperature of from 20° to 25° C. Compounds of formula (I), wherein R is a $C_1$-$C_7$ alkyl, n=0 or 1; X is an ordinary bond or CH=CH—; A=H and B=Cl, are produced by reacting chloroanhydride of benzoic acid or cinnamic acid of the general formula:

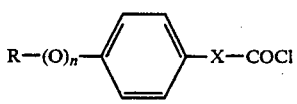

(II)

wherein R is a $C_1-C_7$ alkyl, n=0,1; X is an ordinary bond or —CH=CH—, with 2-chloro-4-hydroxybenzoic acid in pyridine at a temperature within the range of from 20° to 25° C., conversion of the forming acid to its chloroanhydride corresponding to the general formula:

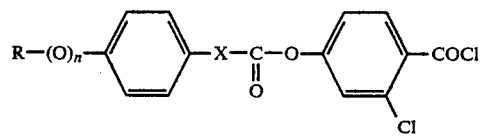

(III)

wherein R, n and X are as identified above for the compounds of the general formula (II), by treating with thionyl chloride in dioxane in the presence of dimethylformamide; the resulting chloroanhydride of the general formula (III) is reacted with aqueous ammonia and the resulting amide is dehydrated by means of thionyl chloride or phosphorus pentoxide in dimethylformamide.

It is also an object of the present invention to provide a process for the production of a mesomorphic material having a low value of optical anisotropy which involves intermixing of the components, followed by heating the resulting mixture under agitation till it converts to an isotropic liquid and cooling the latter to room temperature. A distinctive feature of this process, according to the present invention, consists in that one of the components is a compound A ensuring only a positive dielectric anisotropy, whereas the other component is a compound B ensuring only a lowered value of an optical anisotropy of the material; the amount of component A is varied from 4.9 to 30.0% by weight, the amount of component B—from 70 to 95.1% by weight.

BEST MODE FOR CARRYING-OUT THE INVENTION

The best mode for carrying out the present invention is a mesomorphic material which contains, % by weight: 4-n-butyltranscyclohexanecarboxylic acid—39.19; 4-n-hexyltranscyclohexanecarboxylic acid—45.08; 3-chloro-4-cyanophenylester of 4-n-heptylbenzoic acid—15.73. The material is obtained by mixing the components, followed by heating the resulting mixture to the temperature of 80° C. under stirring and cooling the mixture to room temperature. The thus-produced material has the following characteristics: $T_{C-N}=4°$ C., $T_{N-I}=79°$ C., $\Delta\epsilon=3.3$ (at 25° C.); $\Delta n=0.07$ (at 25° C.).

The material according to the present invention comprises a white turbid liquid in the mesomorphic state and a colourless transparent liquid in the isotropic state; it is stable in storage and operation in electro-optical cells. In the following Table 1 there are given the examples illustrating the present invention and showing the composition of the material and its properties.

In the formulae of the components given in the examples the following symbols are adopted:

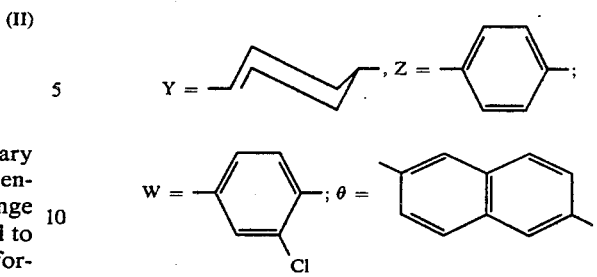

TABLE 1

| Example No. | Content | Content, wt. % | At 25° C. Δε | At 25° C. Δn |
|---|---|---|---|---|
| 1 | $C_4H_9$—Y—COOH | 41.76 | 1.8 | 0.05 |
|   | $C_6H_{13}$—Y—COOH | 48.05 | | |
|   | $C_6H_{13}$—Z—Z—CN | 10.19 | | |
| 2 | $C_4H_9$—Y—COOH | 34.88 | | |
|   | $C_6H_{13}$—Y—COOH | 40.14 | 4.1 | 0.08 |
|   | $C_5H_{11}$—Z—Z—CN | 24.98 | | |
| 3 | $C_4H_9$—Y—COOH | 39.79 | | |
|   | $C_6H_{13}$—Y—COOH | 45.77 | 3.6 | 0.06 |
|   | $C_5H_{11}$—Z—Z—CN | 14.44 | | |
| 4 | $C_4H_9$—Y—COOH | 40.77 | | |
|   | $C_6H_{13}$—Y—COOH | 46.91 | 2.4 | 0.06 |
|   | $C_6H_{13}$—Z—COO—Z—CN | 12.32 | | |
| 5 | $C_4H_9$—Y—COOH | 38.83 | | |
|   | $C_6H_{13}$—Y—COOH | 44.68 | 3.2 | 0.07 |
|   | $C_7H_{15}$—Z—COO—Z—CN | 16.49 | | |
| 6 | $C_4H_9$—Y—COOH | 37.53 | | |
|   | $C_6H_{13}$—Y—COOH | 43.17 | 4.0 | 0.08 |
|   | $C_7H_{15}$—Z—COO—Z—CN | 19.30 | | |
| 7 | $C_4H_9$—Y—COOH | 44.06 | | |
|   | $C_6H_{13}$—Y—COOH | 50.70 | 1.4 | 0.04 |
|   | $C_7H_{15}$—Z—COO—W—COO—Z—CN | 5.24 | | |
| 8 | $C_4H_9$—Y—COOH | 37.13 | | |
|   | $C_6H_{13}$—Y—COOH | 42.71 | 2.2 | 0.07 |
|   | $C_4H_9$—Z—CN | 20.16 | | |
| 9 | $C_4H_9$—Y—COOH | 36.91 | | |
|   | $C_6H_{13}$—Y—COOH | 42.46 | 2.2 | 0.08 |
|   | $C_6H_{13}COO$—θ—CN | 20.63 | | |
| 10 | $C_4H_9$—Y—COOH | 41.85 | | |
|   | $C_6H_{13}$—Y—COOH | 48.15 | 3.4 | 0.06 |
|   | $C_7H_{15}CONH$—Z—CN | 10.0 | | |
| 11 | $C_4H_9$—Y—COOH | 44.2 | 1.1 | 0.04 |
|   | $C_6H_{13}$—Y—COOH | 50.9 | | |
|   | $C_4H_9$—Z—COO—W—CN | 4.9 | | |
| 12 | $C_4H_9$—Y—COOH | 44.2 | | |
|   | $C_6H_{13}$—Y—COOH | 50.9 | 1.0 | 0.04 |
|   | $C_7H_{15}O$—W—COO—Z—CN | 4.9 | | |
| 13 | $C_4H_9$—Y—COOH | 43.2 | | |
|   | $C_6H_{13}$—Y—COOH | 49.8 | 1.5 | 0.05 |
|   | $C_7H_{15}$—Z—COO—W—CN | 7.0 | | |
| 14 | $C_4H_9$—Y—COOH | 32.55 | | |
|   | $C_6H_{13}$—Y—COOH | 37.45 | 8.7 | 0.10 |
|   | $C_7H_{15}$—Z—COO—W—CN | 30.00 | | |
| 15 | $C_4H_9$—Y—COOH | 32.55 | | |
|   | $C_6H_{13}$—Y—COOH | 37.45 | | |
|   | $C_5H_{11}$—Z—COO—W—CN | 14.20 | 9.1 | 0.10 |
|   | $C_7H_{15}Z$—COO—W—CN | 15.10 | | |

As it follows from the above Table 1, the compositions of the mesomorphic material according to the present invention have a lower value of an optical anisotropy as compared to the prior art materials; the value of optical anisotropy Δn can be varied (depending on the material composition) within the range of from 0.04 to 0.10.

The production of the novel compounds of the general formula (I) according to the present invention is illustrated by the following Examples 16 through 22.

EXAMPLE 16

Preparation of 3-chloro-4-cyanophenyl ester of toluic acid

Into a three-neck flask provided with a stirrer and a dropping funnel there are placed 8.6 g of 2-chloro-4-hydroxybenzoic acid and 50 ml of pyridine. To the resulting solution, under stirring and cooling with water, there are added 7.72 g of toluic acid chloroanhydride and allowed to stand overnight. Then the reaction mass is poured into an acidified ice-cold water. The formed precipitate is filtered-off and washed with water to the neutral reaction. The precipitate is air-dried, crystallized from benzene (M.p. 152°–210° C.), then from alcohol (M.p. 185°–213° C.) to give 4.13 g of 2-chloro-4-toluyloxybenzoic acid. From the benzene filtrate after evaporation there are additionally obtained 4.42 g of the product. The total yield is 8.55 g (58.92%).

Into a round-bottom flask with a reflux condenser there are charged 1.73 g of 2-chloro-4-toluyloxybenzoic acid, 10 ml of dioxane, 2.4 ml of thionyl chloride and 1 drop of dry dimethylformamide. Upon heating a vigorous evolution of hydrogen chloride is observed. The reaction mixture is heated at reflux for 2 hours and then cooled to room temperature.

Into a three-neck flask provided with a stirrer, a thermometer and a reflux condenser there are placed 20 ml of a 25% aqueous solution of ammonia and 10 g of ice. At an external cooling with a mixture of ice and water and a vigorous stirring the above-prepared solution of 2-chloro-4-toluylbenzoic acid chloroanhydride is dropwise added for 30 minutes. The formed white precipitate of the amide is stirred for additional 30 minutes. Then the residue is filtered and washed with water to the neutral reaction (as defined by means of an indicator, or all-purpose indicating paper) and dried in the air to give 1.4 (81.4%) g of 2-chloro-4-toluyloxybenzoic acid amide which is recrystallized from ethanol (M.p. 191°–197° C.).

Into a three-neck flask provided with a stirrer, thermometer and a reflux condenser there are charged 0.2 g of the thus-produced amide, 0.21 g of phosphorus pentoxide or thionyl chloride and 1.7 ml of dry dimethylformamide. The mixture is heated under stirring to the temperature of 100° C. and maintained for one hour at this temperature. Then it is cooled to 20° C. and poured into water. The aqueous solution is extracted with chloroform. The extracts are washed with water and dried over $CaCl_2$. A portion of chloroform is distilled-off and the residue is passed through silica gel.

The eluate is distilled-off and the residue is crystallized from hexane to give 0.1 g (53.3%) of the desired product (M.p. 130.5°–131° C.). The results of the analyses and the conventional dielectric anisotropy of this compound and the compounds produced in the following Examples 17, 18, 19 and 20 are given in Table 2.

EXAMPLE 17

Production of 2-chloro-4-cyanophenyl ester of 4-amylbenzoic acid

The product is produced in a manner similar to that described in Example 1, using corresponding starting compounds. The yield of 2-chloro-4-(p-amylbenzoyloxy)-benzoic acid is 28.4%, M.p. 115°–184° C. (from petroleum ether).

The yield of 2-chloro-4-(p-n-amylbenzoyloxy)-benzoic acid amide is 74.6%, M.p. is 172°–177° C. (from ethanol). The yield of the desired product is 44.9%, M.p. is 34°–35° C. (from hexane).

EXAMPLE 18

Preparation of 2-chloro-4-cyanophenyl ester of p-n-heptylbenzoic acid

The production procedure is similar to that described in Example 1; use is made of corresponding starting products. The yield of 2-chloro-4-(p-n-heptyl-benzoyloxy)-benzoic acid is 26.5%, M.p. is 98°–105°C., B.p. 167° C. (from hexane).

The yield of 2-chloro-4-(p-n-heptylbenzoyloxy)-benzoic acid amide is 73.4%, m.p. is 158°–161° C. (from ethanol).

TABLE 2

Conventional dielectric anisotropy of derivatives of p-cyanophenyl esters of benzoic and cinnamoic acids of the general formula (I), wherein A = H, B = Cl.

| No. | R | n | X | Found, % C | H | N | Gross formule | Calculated, % C | H | N | $\Delta\epsilon^*$ |
|---|---|---|---|---|---|---|---|---|---|---|---|
| 1. | $CH_3$ | 0 | Simple bond | 66.5 | 3.6 | 5.4 | $C_{15}H_{10}CO_2$ | 66.3 | 3.7 | 5.2 | +37.0 |
| 2. | $C_5H_{11}$ | 0 | " | 69.4 | 5.5 | 4.4 | $C_{19}H_{18}CO_2$ | 69.6 | 5.5 | 4.3 | +36.5 |
| 3. | $C_7H_{15}$ | 0 | " | 70.5 | 6.1 | 3.8 | $C_{21}H_{22}CO_2$ | 70.9 | 6.2 | 3.9 | +35.0 |
| 4. | $C_7H_{15}$ | 1 | " | 67.9 | 5.9 | 4.0 | $C_{21}H_{22}CO_3$ | 67.8 | 5.7 | 3.8 | +35.0 |
| 5. | $C_7H_{15}$ | 0 | —CH=CH— | 70.9 | 6.1 | 3.1 | $C_{21}H_{24}CO_2$ | 70.5 | 6.8 | 3.9 | +35.0 |

*The novel compounds do not form mesomorphic states and, hence, have no dielectric anisotropy. However, introduction thereof into the mesomorhpic matrix with $\Delta\epsilon = 0$ results in an increased dielectric anisotropy of the latter. The conventional dielectric anisotropy of the novel compounds is calculated on the basis of the value of increment of $\Delta\epsilon$ of the mesomorphic matrix and the amount of the introduced additive, using the rule of additivity of $\Delta\epsilon$ of the mixture.

The yield of the desired product is 45%, M.p. is 25°–28° C. (from hexane).

EXAMPLE 19

Preparation of 2-chloro-4-cyanophenyl ester of p-n-heptyloxybenzoic acid

The product is obtained following the procedure described in Example 1 hereinbefore, using corresponding starting compounds. The yield of 2-chloro-4-(p-n-heptyloxy-benzoyloxy)-benzoic acid is 80.1%, M.p. is 84°–110°–157° C., $T_{C-S}=84°$ C., $T_{S-N}=110°$ C., $T_{N-I}=157°$ C. (from hexane). The yield after crystallization is 27%. The yield of 2-chloro-4-(p-n-heptyloxybenzoyloxy)-benzoic acid amide is 80.2%, M.p. is 170.5°–173° C. (from ethanol). The yield after crystallization is 62.2%. The desired product yield is 55.9%, M.p. is 55.5°–57° C. (from hexane).

EXAMPLE 20

Preparation of 2-chloro-4-cyanophenyl ester of p-n-heptyl-ciannamic acid

The product is obtained in a manner similar to that described in Example 1 from corresponding starting compounds. The yield of 2-chloro-4-(p-n-heptylcinnamoyloxy)-benzoic acid is 89.7%, $T_{C-S}$ 115° C., $T_{S-N}$ 137° C., $T_{N-I}$ 187° C. (from a mixture hexane-ethanol). The yield of the product after crystallization is 27.5%. The yield of 2-chloro-4-(p-n-heptylcinnamoyloxy)benzoic acid amide is 90%. The yield after recrystallization from ethanol is 68%, M.p. 160°–161.5° C. (from ethanol). The yield of the desired product is 21.7%, M.p. 39.5°–41.5° C. (from hexane).

EXAMPLE 21 p-Cyanophenyl ester of ortho-chloro-para-n-butoxybenzoic acid 9 g of caustic soda are dissolved in 200 ml of ethanol. To the thus-prepared solution there are added 17.25 g of 2-chloro-4-hydroxybenzoic acid and 18.4 g of butyl iodide. The resulting solution is heated at reflux under stirring for 5 hours, cooled, poured into 200 ml of water and acidified, to pH=1, with hydrochloric acid. The precipitate is filtered-off, washed with water and dried to give 16.4 g of ortho-chloro-para-n-butyoxybenzoic acid which is recrystallized from hexane. The yield of the recrystallized product is 13.8 g (60.5%), M.p. 92°–93° C.

4.35 g of the resulting ortho-chloro-para-n-butoxybenzoic acid and 5 ml of thionyl chloride are heated at reflux for 3 hours, cooled to the temperature of 20° C. and added to a solution of 2.1 g of hydroxybenzonitrile in 21 ml of pyridine under stirring and cooling with cold water, whereafter the reaction mass is allowed to stay overnight. Then the reaction mass is poured into acidified ice-cold water, extracted with chloroform, the extract is washed with water and dried over calcium chloride. The resulting solution is passed through a column packed with silica gel. The column is rinsed with chloroform. The eluate is evaporated to dryness and the residue (6.73 g) is recrystallized from hexane. There are thus obtained 4.2 g of p-cyanophenyl o-chloro-p-n-butoxybenzoic acid ester, M.p. 59°–61° C. Found, %: C 65.8; H 4.7. $C_{18}H_{16}NClO_2$. Calculated, %: C 65.3; H 4.5. $\Delta\epsilon=31$.

The conventional dielectric anisotropy ($\Delta\epsilon$) is determined by the value of increment of the dielectric anisotropy of the mesomorphic matrix having $\Delta\epsilon$ about zero, upon the addition thereto of a specified amount of the novel compound using the rule of additivity of $\Delta\epsilon$ of a mixture.

EXAMPLE 22 p-Cyanophenyl ester of ortho-chloro-para-n-heptyloxybenzoic acid

The product is obtained following the procedure described in the foregoing Example 21 using the corresponding starting compounds.

The yield of ortho-chloro-para-n-heptyloxybenzoic acid before crystallization is 40.8%; after crystallization from hexane it is 31.48%; M.p. is 82.6°–83°. The yield of the desired product before crystallization is 84%, after crystallization from hexane it is 57%, M.p. 51.5°–53° C. Found, %: C 67.8; H 5.8. $C_{21}H_{22}NClO_2$. Calculated, %: C 67.8; H 5.7. $\Delta\epsilon=30.0$.

INDUSTRIAL APPLICABILITY

The present invention can be useful in various electrooptical devices and optico-electronic systems for presentation of information.

We claim:

1. A mesomorphic material with a low value of optical anisotropy which comprises at least one aromatic nitrile selected from the class of aromatic nitriles represented by compounds of the general formula $$R(O)_m—X—CN$$

where m=0 or 1, R is alkyl with 4 to 7 carbon atoms, and X is

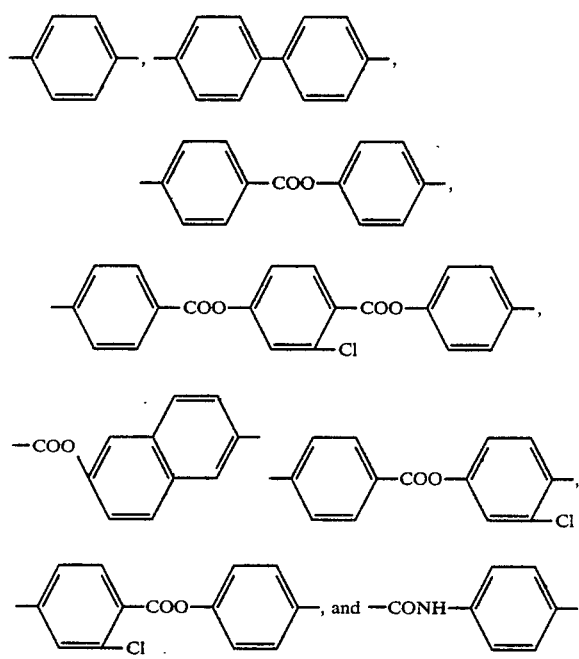

said aromatic nitrile being present in an amount ranging from 4.9 to 19.3% by weight, and a mixture of 4-n-butyltranscyclohexane carboxylic acid and 4-n-hexyltranscyclohexane carboxylic acid, said mixture being present in an amount ranging from 80.7% to 95.1% by weight and the molar ratio between said carboxylic acids in said mixture being 1:1.

* * * * *